(No Model.)
E. G. GOLDER.
MERCURY GAGE.
No. 584,998. Patented June 22, 1897.
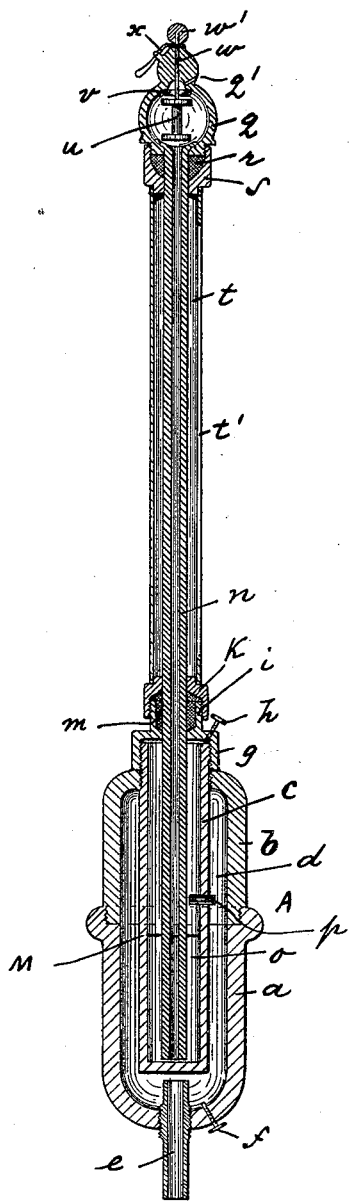
WITNESSES:
Wm. D. Bell.
Duncan M. Robertson.
INVENTOR:
Emanuel G. Golder
BY Partner & Co ATTY'S.

UNITED STATES PATENT OFFICE.

EMANUEL G. GOLDER, OF LAKE VIEW, NEW JERSEY.

MERCURY-GAGE.

SPECIFICATION forming part of Letters Patent No. 584,998, dated June 22, 1897.

Application filed November 13, 1896. Serial No. 611,928. (No model.)

*To all whom it may concern:*

Be it known that I, EMANUEL G. GOLDER, a citizen of the United States, residing in Lake View, Passaic county, and State of New Jersey, have invented certain new and useful Improvements in Mercury-Gages; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

The object of this invention is to provide a mercury-gage especially applicable for testing gas-pipes, of simple, strong, and durable construction, reliable in operation, and which by rough usage, like tilting, shaking, &c.,will not allow the mercury to escape.

The invention consists in the improved mercury-gage and in the combination and arrangements of the various parts thereof, substantially as will be hereinafter more fully described, and finally embodied in the clauses of the claim.

In the accompanying drawing, which represents a central vertical section of my improved mercury-gage, A is a casing, preferably made of two sections $a$ and $b$, secured together by screw-thread connection or in any desired manner, and penetrated in the bottom of its lower section by the tube $e$, which latter is adapted to be connected to the system of gas-pipes to be tested in the usual manner. Within said casing is arranged and secured thereto by its screw-threaded upper portion the tube-like receptacle $c$, closed at its upper end by means of the internally-threaded cap $g$, which latter is provided with a valve $h$ and with an upwardly-projecting annular flange $i$ and is centrally penetrated by the glass tube $n$, extending to about the bottom of the said tube-like receptacle $c$. The latter forms with the casing A an annular chamber $d$ and with the glass tube $n$ an annular chamber $o$, as will be manifest.

The casing A is provided at its lower section with a valve $f$, for a purpose hereinafter described. The receptacle $c$ is penetrated within the casing A by the tube $p$, arranged substantially at right angles thereto and extending to about the glass tube $n$.

The annular flange $i$ of the cap $g$ is externally threaded and is engaged by the auxiliary cap $k$, forming with the said flange an annular chamber surrounding the glass tube $n$ and containing a suitable packing material $m$, as clearly shown.

On the upper portion of the glass tube $n$ is arranged a valve-chamber $q$, provided with an externally-threaded neck engaged by the internally-threaded hollow cap $s$, surrounding the glass tube $n$, and forming with the latter an annular chamber containing a suitable packing material $r$, and adapted, in connection with the auxiliary cap $k$, to securely hold the metallic tube $t$ in position, which latter surrounds the glass tube $n$, and thus forms a protector, especially in case the latter should break on account of excessive pressure when in use. Said tube $t$ is provided with a vertically-arranged elongated slot $t'$ for the purpose of observing and thereby gaging the heights of the mercury in tube $n$.

The valve-chamber $q$, which is provided near its upper portion and on one side with a vent $q'$, is penetrated by the stem $w$, carrying at its lower end the double-headed valve $u$ and at its upper end a head $w'$. The upper section of said double-headed valve is adapted to engage an elastic ring or seat $v$, arranged within the valve-chamber and below the vent $q'$, and surrounds the stem $w$ of the said valve, all as clearly shown in the drawing. The head $w'$ is engaged by the forked portion of the lever $x$, pivotally secured on the said valve-chamber and adapted to be operated by hand to thus close the vent $q'$, as will be manifest.

Mercury is placed in the tube-like receptacle $c$ to about the level as indicated by line M and is bound to remain in said receptacle even when the gage is laid on its side, as the tube $p$ extends to about the glass tube $n$, as heretofore described, and thus prevents the mercury from entering the casing A; but should by any accident mercury enter the said casing it will accumulate at the bottom section $a$ and around the inwardly-projecting portion of the tube $e$ and can easily be drawn therefrom by removing the valve $f$, and by opening the valve $h$ can be replaced in the receptacle $c$, as will be manifest.

When the gage is in use and connected with the system of pipes to be tested, the mercury will ascend in the glass tube as the pressure increases, and its heights can easily be seen through the slot $t'$ and thus be measured. The air escapes through the vent $q'$. Should the pressure be too great and the mercury be forced into the valve-chamber, the valve $u$ will be floated upward by the said mercury against the elastic ring $v$ and thus close the vent $q'$ and prevent the escaping of the mercury.

Having thus described my invention, what I claim as new, and desire to secure by Letters Patent, is—

1. The combination with a casing provided with an inlet, of a tube-like receptacle in said casing and adjustably secured thereto, and forming with the latter an annular chamber, a cap removably secured on the receptacle, a glass tube penetrating said cap and extending into the said receptacle, and forming with the latter an annular chamber, a tube penetrating the receptacle and forming a communication between the said annular chambers, a valve-chamber on the upper portion of the glass tube and provided with a vent, a valve in said chamber and adapted to control said vent, and means for operating said valve, all said parts, substantially as and for the purposes described.

2. The combination with a casing provided with an inlet, of a tube-like receptacle in said casing and adjustably secured thereto, and forming with the latter an annular chamber, a cap removably secured on said receptacle, a glass tube penetrating said cap and extending into the said receptacle, and forming with the latter an annular chamber, a tube penetrating the receptacle and forming a communication between the said annular chambers, a valve-chamber on the upper portion of the glass tube and provided with a vent, an elastic ring or seat in said valve-chamber and below the vent, a valve in said valve-chamber and adapted to engage said ring, and means for operating said valve, all said parts, substantially as and for the purposes described.

3. The combination with a casing, of a tube penetrating the bottom thereof, a valve in said casing and on one side of the tube, a tube-like receptacle adjustably secured in said casing and communicating therewith, a cap removably secured on the receptacle and provided with a valve, a glass tube penetrating said cap and extending into the said receptacle, a valve-chamber on the upper portion of the glass tube and provided with a vent, a valve in said chamber and adapted to control said vent, and means for operating said valve, all said parts, substantially as and for the purposes described.

In testimony that I claim the foregoing I have hereunto set my hand this 2d day of November, 1896.

EMANUEL G. GOLDER.

Witnesses:
ALFRED GARTNER,
DUNCAN M. ROBERTSON.